United States Patent
Bhullar et al.

(10) Patent No.: US 7,627,741 B2
(45) Date of Patent: Dec. 1, 2009

(54) INSTRUCTION PROCESSING CIRCUIT INCLUDING FREEZING CIRCUITS FOR FREEZING OR PASSING INSTRUCTION SIGNALS TO SUB-DECODING CIRCUITS

(75) Inventors: Harpreet Singh Bhullar, Nijmegen (NL); Henricus Hubertus Van Den Berg, Nijmegen (NL); Ronald Hubertus Bernardus Schiffelers, Nijmegen (NL); Simon-Thijs De Feber, Nijmegen (NL)

(73) Assignee: NXP B.V., Eindhoven (NL)

( * ) Notice: Subject to any disclaimer, the term of this patent is extended or adjusted under 35 U.S.C. 154(b) by 365 days.

(21) Appl. No.: 11/630,654

(22) PCT Filed: Jun. 20, 2005

(86) PCT No.: PCT/IB2005/052016

§ 371 (c)(1),
(2), (4) Date: Dec. 22, 2006

(87) PCT Pub. No.: WO2006/000979

PCT Pub. Date: Jan. 5, 2006

(65) Prior Publication Data

US 2007/0250686 A1    Oct. 25, 2007

(30) Foreign Application Priority Data

Jun. 25, 2004    (EP) .................................. 04102964

(51) Int. Cl.
*G06F 9/00* (2006.01)
*G06F 1/32* (2006.01)
(52) U.S. Cl. ...................... 712/208; 713/324
(58) Field of Classification Search ................. 712/208, 712/213; 713/300, 320, 322, 324
See application file for complete search history.

(56) References Cited

U.S. PATENT DOCUMENTS 6,202,163 B1 * 3/2001 Gabzdyl et al. ............. 713/324

* cited by examiner

*Primary Examiner*—David J Huisman

(57) ABSTRACT

An instruction processing circuit includes an instruction decoder, with an instruction input coupled to an instruction source and a control output coupled to the control input of an execution circuit. The instruction decoder includes a predecoding circuit, multiple freezing circuits and multiple sub-decoding circuits. The predecoding circuit has an input coupled to the instruction input and outputs coupled to control inputs of the freezing circuits, which feed the respective parallel sub-decoding circuits. The predecoding circuit detects to which type of instruction a supplied instruction belongs, and controls, dependent on the detected type, to which of the sub-decoding circuits instruction information derived from the supplied instruction will be passed and to which of the sub-decoding circuits supply of instruction information derived from a previously supplied instruction will be frozen.

9 Claims, 4 Drawing Sheets

Figure 1:
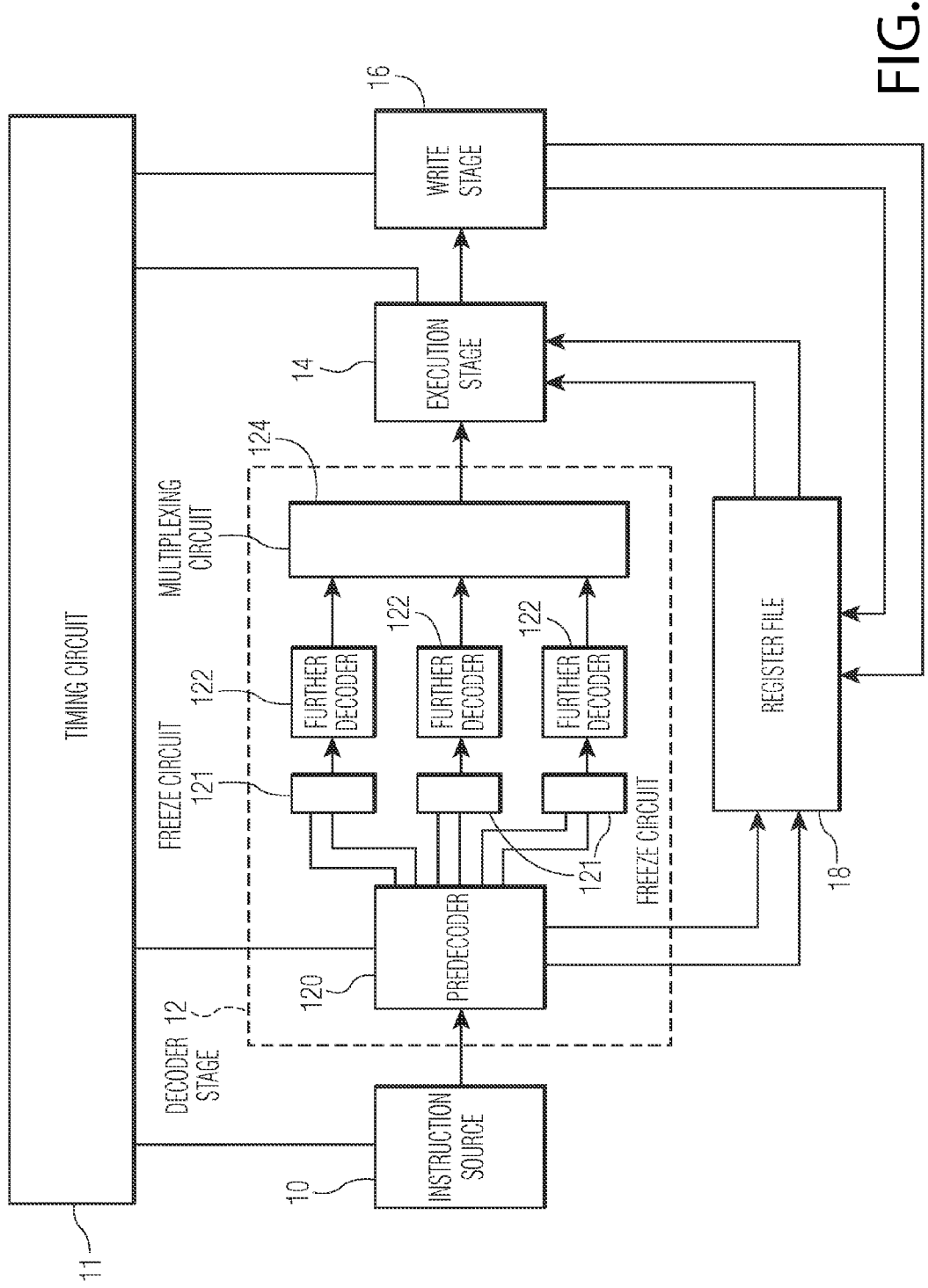

INSTRUCTION PROCESSING CIRCUIT INCLUDING FREEZING CIRCUITS FOR FREEZING OR PASSING INSTRUCTION SIGNALS TO SUB-DECODING CIRCUITS

The invention relates to an instruction processing circuit, to decoding of instructions in such an instruction processing circuit and a method of processing instructions.

A computer is generally designed to execute a program of instructions wherein each instruction specifies at least one operation that should be executed by the computer (e.g. an addition, or a load from memory) and the operand or operands to which the operation should be applied. In order to process the instructions the computer contains an execution circuit that applies the operation to the operand. The execution circuit has a control input to control the way it processes its operands, e.g. whether the execution circuit adds or subtracts operands, or the execution circuit applies a bit-by-bit logic operation to the operands like a logic AND or OR, or a shift operation, or the execution circuit stores an operand in memory etc.

An instruction decoder is used to translate the instructions into control signals for the execution circuit. Typically, modern instruction processors have a pipelined design, which allows decoding of an instruction to take place at the same time as processing of the operands in response to a previous instruction. In this case the instruction processor contains a number of stages coupled by pipeline registers and a timing circuit that makes each pipeline register capture the output of a preceding stage and apply the output as input to a subsequent stage. In this type of pipelined circuit, a decoder stage contains the instruction decoder and an execution stage includes the execution circuit.

Reduction of power consumption is an increasingly important concern for processor design. Many approaches to the reduction of power consumption aim to prevent needless copying of operand data. An article titled "Reducing Switching Activity on Datapath Buses with Control-Signal Gating", by Hema Kapadia, Giovanni de Micheli and Luca Benini describes a number of approaches. For example, clock gating is a popular approach, which prevents the application of clock signals, which prevents data from being loaded into registers. This saves power first of all because the power to load the data into the register is not needed and secondly because logic transitions (generally called "toggling") in circuits that receive data from the register are avoided. Another approach is the use of guarded evaluation which places enabled transparent latches at the input of data processing modules that may selectively be turned off. A further approach is the use of control signal gating, which disables control signal transitions that result in needless data changes, for example by preventing multiplexers from changing the input from which data is passed to the output if the signal at the output is not needed. Similar approaches include "bus-sectioning", which divides data busses into sections and allows changes in the data to propagate only to those sections from which data is really needed.

Typically the instruction executed by a processor controls where copying of the operand data is prevented, be it by means of clock gating, guarded evaluation, control signal gating bus sectioning etc. From the instruction it is determined from which data processing circuits no operand data will be needed and toggling in these circuits is prevented. For each new instruction new data processing circuits may be selected for this purpose.

Instruction decoding is typically needed for every instruction. None of the approaches discussed above address the power consumption involved with instruction decoding.

Among others, it is an object of the invention to reduce power consumption due to instruction decoding.

An instruction processor according to the invention is set forth in claim 1. According to the invention power is saved by grouping the instruction decoder into a number of parallel sub-decoder branches, for respective types of instruction, and freezing the inputs of selected sub-decoders, so that new instruction information cannot pass to those sub-decoders, which are selected by a predecoder dependent upon the type of instruction. Typically plural sub-decoders are coupled to the same control inputs of the execution circuit, selected sub-decoders being active to control the input of the execution circuit dependent on the type of the instruction.

In an embodiment wherein a pipelined processor is used the freezing circuits are switched between freezing and passing within a pipelined instruction cycle, after predecoding during that instruction cycle and before an effect of signals from the pipeline register in front of the decoding stage reach the sub-decoding circuits. In this way no additional pipeline stages are needed for freezing. In an alternative embodiment, however, separate pipeline stages are used and the freezing circuit effectively form a pipeline register.

In a further embodiment a freezing circuits comprises multiplexer which passes data from an input or from a feedback register that captures and freezes an output of the multiplexer. In this way freezing is realized in a decoder without introducing an additional register in the critical path.

In an embodiment a first type of instruction, subdecoded by a first one of the sub-decoders, includes memory access instructions with absolute addresses and a second type of instruction, subdecoded by a second one of the sub-decoders, includes memory access instructions with indexed addresses. Although part of decoding of these types of instruction involve the same processing, the address computation is performed by different sub-decoders so that power consumption can be reduced by selectively activating only one of these decoders.

In another embodiment the execution circuit comprises an ALU circuit with an arithmetic part and a logic part and a first and second operand freezing circuit, are coupled between an operand source (the arithmetic part and the logic part respectively and operable to selectively freeze or pass an operand, dependent on whether an arithmetic instruction or a logic instruction is executed). Because it has been found that the arithmetic and logic circuits are largely disjoint this has been found to reduce power consumption because needless operand dependent signal transitions in the arithmetic and logic circuits can be avoided.

These and other objects and advantageous aspects of the invention will be described in more detail by means of non-limitative examples, using the following figures.

Figure 1A:
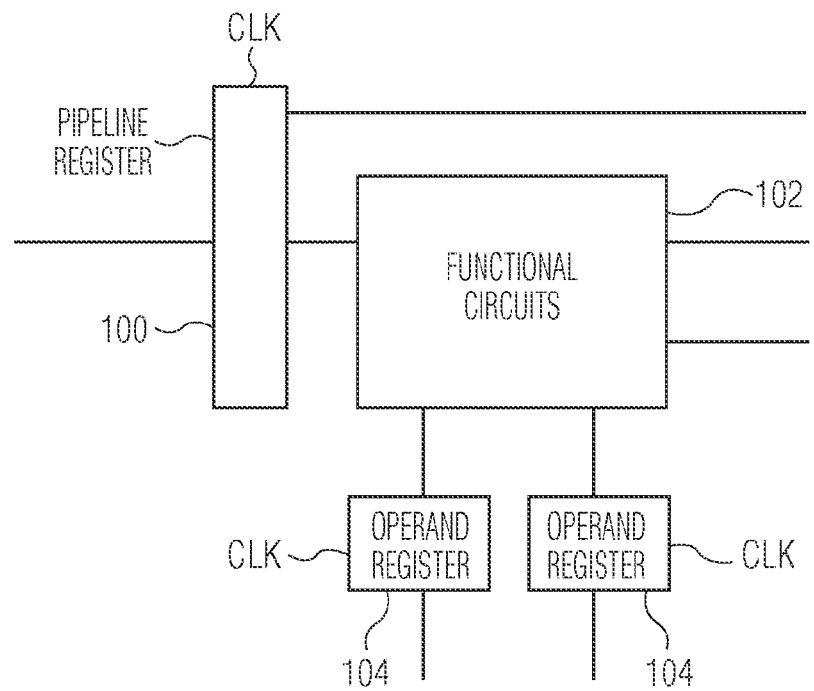
Figure 2:
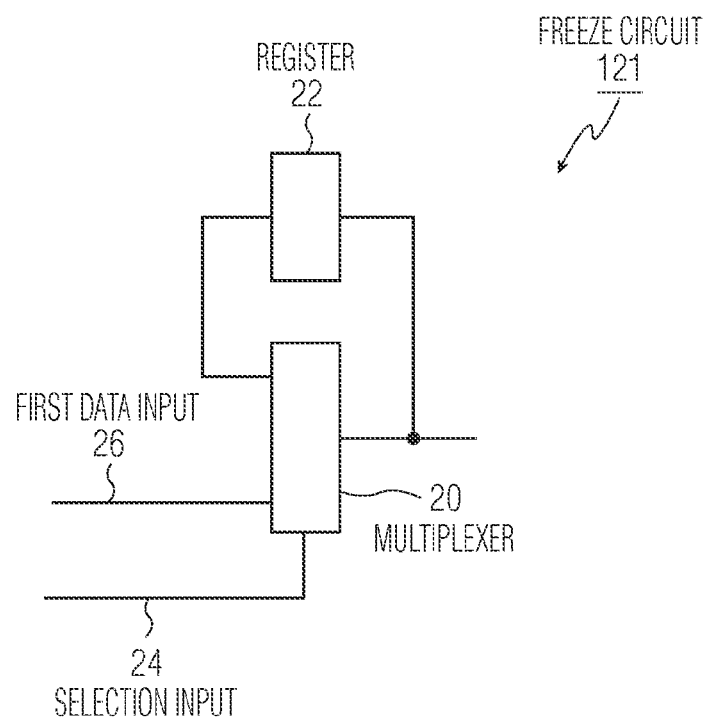
Figure 3:
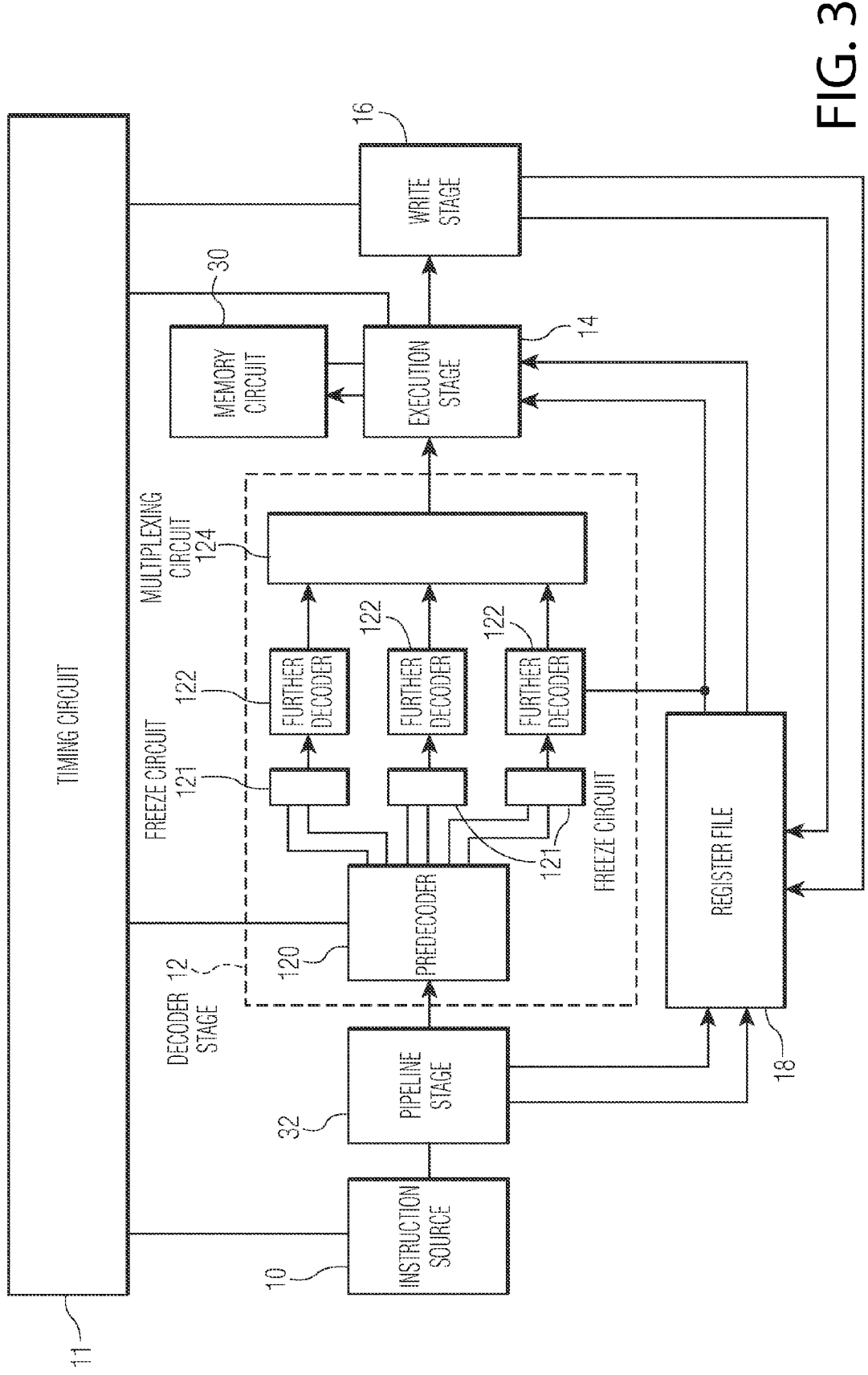
Figure 4:
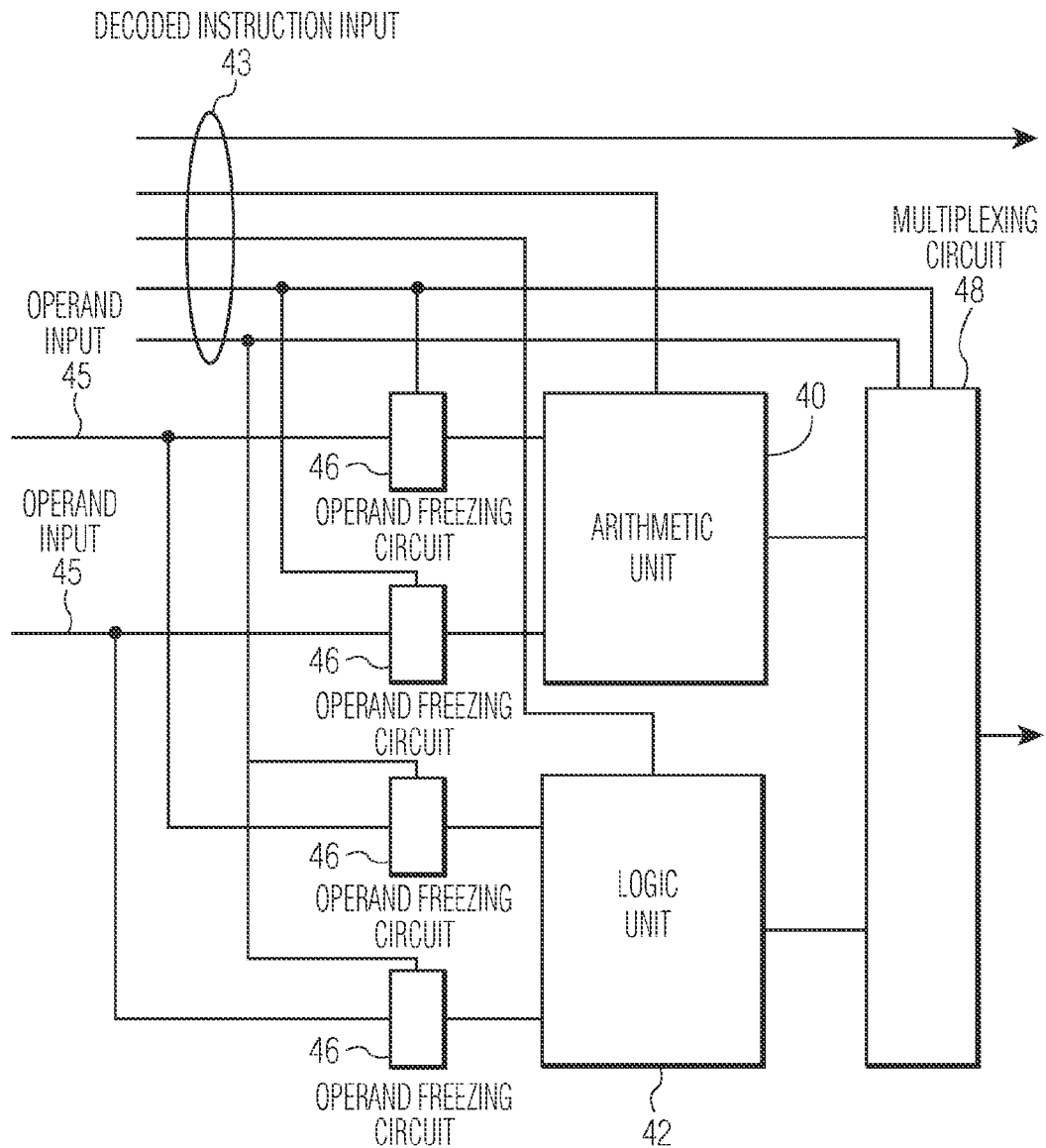

FIG. 1 shows an instruction processing circuit;
FIG. 1a shows a structure of a pipeline stage;
FIG. 2 shows a freezing circuit;
FIG. 3 shows a further instruction processing circuit;
FIG. 4 shows an instruction execution circuit;

FIG. 1 shows an instruction processing circuit, comprising an instruction source 10, a timing circuit 11, a decoder stage 12, an execution stage 14, a write stage 16 and a register file 18. Instruction source 10 has an instruction output coupled to decoder stage 12. Decoder stage 12 has operand selection outputs coupled to register file 18 and a decoded output coupled to execution stage 14. Register file 18 has operand outputs coupled to execution stage 14. Execution stage 14 has a result output coupled to write stage 16. Write stage 16 has an output coupled to a write port of register file 18. Timing circuit 11 has timing control outputs coupled to instruction source 10, decoder stage 12 execution stage 14 and write stage 16.

Instruction source 10 typically contains an instruction memory (not shown) and a program counter (not shown) for addressing instructions in the instruction memory. In this case the instructions are supplied from the instruction memory to decoder stage 12.

Decoder stage 12 contains a predecoder 120, coupled to multiple parallel decoder branches, each branch containing a freeze circuit 121 and a further decoder 122. Outputs of further decoders 122 are coupled to the input of execution stage 14 via a multiplexing circuit 124. Such a multiplexing circuit may be implemented for example as a logic circuit that outputs copies of signals from selected inputs, or, if the logic level at the outputs of inactive further decoders 124 can be predicted, as AND or OR circuits that receive inputs from further decoders 122, direct connection of the outputs of further encoders 122 to a common input of execution stage 14 if tri-state outputs are used for the further decoders 124.

In operation instruction source 10 produces instructions and applies the instructions successively to decoder stage 12. Decoder stage 12 extracts operand register addresses from the instructions and applies them to register file 18. Decoder stage 12 also decodes the instruction and applies decoded information to execution stage 14. Execution stage 14 executes an operation selected by the instruction, using operands received from register file 18 and producing a result which is applied to write stage 16. Write stage 16 writes back the result to register file 18 in a register specified by the instruction. The circuit works in pipelined fashion, the stages performing their respective functions in parallel, applied to respective successive instructions. For this purpose timing circuit 11 clocks instruction source 10, decoder stage 12, execution stage 14 and write stage 16 substantially simultaneously to load new information into registers (not shown) at the inputs of the stages, each time at the end of an execution cycle.

FIG. 1a shows an example of the structure of a pipeline stage, which may be used for execution stage for example, with a pipeline register 100, functional circuits 102 and operand registers 104. Pipeline register 100 receives control data derived from an instruction and passes this data to the functional circuits 102. Part of the control data (e.g. the address of a result register) may be passed directly to the next pipeline stage. Operand registers 104 receive operand data and pass this data to functional circuit 102. Functional circuit 102 produces result data and optionally control data for a subsequent stage. Pipeline register 100 and operand registers 104 are clocked with a clock signal CLK of the stage, which selects the time of loading data. It will be appreciated that a similar structure may be used for each pipeline stage, but that dependent on the type of stage, operand registers 1004 may be omitted and that the some types of stage produce control data and others do not.

Further decoders 122 function as sub-decoders, performing a part of decoding of the instructions, each further decoder performing that part only for a type of instruction that requires that part of decoding.

Only part of decoder stage 12 is active to decode the instructions. Predecoder 120 determines from each instruction which of the branches 121, 122 should be used to perform further (sub-)decoding of the instruction. Pre-decoder 120 supplies information from the instructions (optionally pre-decoded from the instructions) to the branches 121, 122. However, before replacing the information from a previous instruction at the input of further decoders 122, pre-decoder 120 determines which of the branches should be used to decode the instruction. Subsequently, predecoder 120 signals the freeze circuits 121 of the other branches to keep the information that is supplied to the other branches unchanged, equal to the previously supplied information. Only the freeze circuit 121 of the selected branch is allowed to pass changes with respect to the previous instruction. Although separate outputs of predecoder 120 have been shown connected to freezing circuits 121, it should be appreciated that in practice some or all of the freezing circuits 121 may have shared inputs for control data for further decoders 122, when different further decoders 122 require the same control data.

FIG. 2 shows an embodiment of a freezing circuit 121. In the example freezing circuit 121 contains a multiplexer 20 and a register 22. Multiplexer 20 has a selection input 24 coupled to a selection output of predecoder 120 (not shown), a first data input (26) coupled to an instruction information output of predecoder 120 and a second data input coupled to an output of register 22. Multiplexer 20 has an output coupled to the further decoder 122 (not shown) of the branch to which freezing circuit 121 belongs and to an input of register 22.

In operation multiplexer 20 passes instruction information from predecoder 120 (not shown) to further decoder 122 (not shown) when predecoder 120 signals that the information should not be frozen and multiplexer 20 passes information from register 22 to further decoder 122 (not shown) when predecoder 120 signals that the information should be frozen. Register 22 typically receives a clock signal from timing circuit 11 to load information from the input of register 22 at the end of an execution cycle when timing circuit 11 clocks the stages 12, 14, 16 to load new information. In this way only the content of register 22 in the stage that passes data changes.

However, it should be appreciated that in alternative embodiments different loading time points may be used (obtained e.g. by delaying a clock signal of the input of the decoder stage by a delay time that corresponds to the time needed to determine which of the further decoders 122 will be used), or that loading of new data into register 22 may be suppressed altogether in those freezing circuits where the data is frozen. Similarly, instead of the circuit of FIG. 2 may be used, such as a transparent/hold latch for example, which is kept in hold mode if the following further decoder 122 is not used and switched to transparent mode if the following further decoder is used. However, this solution is typically slightly slower than that of FIG. 2 and may therefore require longer instruction cycle times.

Pre-decoder 120 is arranged so that initially in an execution cycle a signal to freeze the information is supplied to freezing circuit 121. Once predecoder 120 has determined which of the branches 121, 122 should pass the instruction information predecoder 120 changes the control signal of the freeze circuit 121 of that branch to allow new information to pass. Typically, this occurs with some delay after the start of an execution cycle and some time before the end of the execution cycle. In this way power dissipation in the other branches is reduced.

Multiplexing circuit 124 passes decoded instruction information from the selected branch to execution stage 14 for use during execution in the next execution cycle.

Although an example has been shown wherein decoding takes place in a single pipeline stage, it should be understood that, without deviating from the invention, a multi-stage decoder may be used, so that successive decoding steps of an instruction take place in successive execution cycles in successive decoding stages. In this case freezing circuits 121 may be in the interior of a decoding stage, i.e. they may be switched from freezing to passing with a delay after the start of an execution cycle, after a preceding part of the same decoding stage has been able to determine which branch should be used.

As an alternative, freezing circuits at the input or output of a decoding stage may be used, so that freezing or passing takes place substantially at the start of an instruction cycle under control of a preceding stage. In this case the freezing circuits 121 are effectively form the pipeline register in front of the further decoders 122. Instead of the freezing circuit of FIG. 2 conventional registers may be used and the freezing registers may be clocked together with the other pipeline registers. The difference with a conventional pipeline register is that updating of part of the freezing circuits is disabled, dependent on the result of predecoding and that one or more freezing circuits may have shared inputs, if their subsequent further decoders 122 need the same control data, to enable freezing of that control data selectively for those further decoders 122 that do not need to be active, while the same control data is passed to an active further decoder 122. However, this offers less flexibility in the selection of the branches.

In an example of an application of the invention the instructions include memory access instructions, which are executed by execution stage 14 by accessing memory circuit. Memory access instructions typically include LOAD and STORE instructions and specify an address in the memory circuit from or to which data should be loaded or stored. Different access instructions may specify the address in different ways, for example as a literal address contained in the instruction (which is called absolute addressing), or by reference to a register that contains the address (which is called indexed addressing), or even a combination of a reference to a register and a literal address that should be added to the content of the register to obtain the address.

FIG. 3 shows an instruction execution circuit that supports memory access instructions. In comparison with FIG. 1 a memory circuit 30 has been added, coupled to execution stage 14. An output of register file 18 has been coupled to one of the further decoders 122 and a separate pipeline stage 32 has been inserted between instruction source 10 and decoding stage 12 for performing part of the predecoding.

In operation, if a memory access instruction is supplied, the circuit determines whether the memory access instruction uses absolute addressing or indexed addressing, dependent on the type of addressing, one further decoder 122 or another is used and the decoded instruction information inputs to the other further decoders 122 are frozen to reduce power consumption. When indexed addressing is used, the corresponding further decoder 122 receives data from register file 18, derives an address from that data and supplies the address to execution stage 14. When absolute addressing is used, the corresponding further decoder 122 receives address information from the instruction, derives an address from that address information and supplies the address to execution stage 14.

FIG. 4 shows an example of an execution stage, or at least an arithmetic/logic part of an execution stage. The execution stage contains an arithmetic unit 40 and a logic unit 42. Arithmetic unit 40 and logic unit 42 are coupled to a pair of operand inputs 45, each via a respective pair of operand freezing circuits 46. The outputs of arithmetic unit 40 and logic unit 42 are coupled to a result output of the execution stage via a multiplexing circuit 48. A decoded instruction input 43 is coupled to control inputs of operand freezing circuits 46, arithmetic unit 40, logic unit 42, multiplexing circuit 48 and a result register address output of the execution stage.

Arithmetic unit 40 is arranged to execute at least addition, and preferably subtraction and/or other arithmetic operations that produce multi-bit results in which one or more bits depend on more than one bit from each input operand, typically as the result of carry or borrow between bits of different significance level. Logic unit 42 is arranged to execute logic operations, such as bit-wise AND, or bit-wise OR that produce results in which each result bit depends on one input bit from each input operand only.

In operation, operand freezing circuits 46 receive control signals to freeze the operand inputs of the arithmetic unit 40 or the logic unit 42, dependent on whether an arithmetic or a logic instruction is executed. This reduces power consumption. Arithmetic unit 40 or logic unit 42 receives a control selection signal to select the instruction that should be executed (e.g. add or subtract, bit-wise AND or bit-wise OR). Preferably, the instruction signal supplied to the arithmetic unit 40 or the logic unit 42, whichever is not used in an instruction cycle, is also frozen in the instruction cycle to reduce power consumption even further. As may be appreciated, selection of freezing or passing may be arranged to occur at the start of an execution cycle of the execution stage to provide a simple timing design. In another embodiment unfreezing of supply of operands and/or the instruction to a selected one of the arithmetic unit 40 and logic unit 42 may occur with a delay with respect to the start of an instruction cycle of the execution stage, so as to allow for preliminary processing in the execution stage.

Although the invention has been illustrated using specific embodiments, it should be appreciated that the invention is not limited to these embodiments. For example, although the invention has been described for a pipelined processor, it will be appreciated that freezing may also be applied in processors whose operation is not pipelined, or processors that are not centrally clocked such as asynchronous processors that use handshake communication. Similarly, although separate operand freezing in front of an arithmetic unit and a logic unit is preferably used in combination with freezing of instruction information, it should be realized that the former can also be used without the latter.

Furthermore, although an example has been given wherein a multiplexing circuit 124 is used, so that the decoded information from different further decoders 122 is supplied to the same input of execution stage 14, it should be appreciated that, alternatively different further decoders 122 may supply decoding results to different parts of an execution stage. Supplying decoded information from different further decoders 122 to the same input of execution stage 14 has the advantage that power can be saved for different types of instructions (which are partly decoded using different further decoders 122) that require use of the same hardware in execution stage 14. The case of absolute and indexed addressed instructions is but one example of such an instruction. Other examples include different kinds of compound arithmetic instructions (e.g. complex arithmetic instructions). Information from part or all of further decoders may be supplied to the same input of execution stage 14.

The invention claimed is:

1. An instruction processing circuit comprising:
    an instruction source for producing successive instructions;
    an execution circuit having operand inputs for receiving operands selected by the instructions and a control input for controlling execution of operations applied to the operands; and
    an instruction decoder having an instruction input coupled to the instruction source and a control output coupled to the control input of the execution circuit, the instruction decoder being arranged to generate successive control signals at the control output under control of respective ones of the instructions, the instruction decoder comprising:

a plurality of sub-decoding circuits coupled in parallel between the instruction input and the control output, each for generating control signals for a respective type of instruction;

input freezing circuits, each coupled between the instruction input and a respective one of the sub-decoding circuits, each freezing circuit having a control input, each freezing circuit being arranged to freeze or pass instruction signals to its respective one of the sub-decoding circuits under control of its control input; and a predecoding circuit with an input coupled to the instruction input and outputs coupled to the control inputs of the freezing circuits, and arranged to detect to which type of instruction a supplied instruction belongs, and to control, dependent on the detected type, to which of the sub-decoding circuits instruction information derived from the supplied instruction will be passed and to which of the sub-decoding circuits supply of instruction information derived from a previously supplied instruction will be frozen;

wherein at least one of the freezing circuits comprises a freezing register with an input and an output, and a multiplexer with a first input coupled to the instruction source, a second input coupled to the output of the freezing register, an output coupled to the input of the freezing register and to the sub-decoding circuit that is coupled to the freezing circuit, and a control input coupled to the predecoding circuit.

2. An instruction processing circuit according to claim 1 further comprising pipeline stages, pipeline registers coupling between pairs of successive pipeline stages and a timing circuit coupled to the pipeline registers to control successive instruction cycles wherein successive pipeline stages perform respective parts of processing of successive instructions in parallel, the pipeline stages including an execution stage that comprises the execution circuit, and a decoding stage, which comprises at least part of the predecoding circuit, the input freezing circuits and at least part of the sub-decoding circuits, the input freezing circuits being arranged to switch between freezing and passing within an instruction cycle after predecoding during that instruction cycle and before an effect of signals from the pipeline register in front of the decoding stage reach the sub-decoding circuits.

3. An instruction processing circuit according to claim 1 further comprising pipeline stages, pipeline registers coupled between pairs of successive pipeline stages and a timing circuit coupled to the pipeline registers to control successive instruction cycles wherein successive pipeline stages perform respective parts of processing of successive instructions in parallel, the pipeline stages including a first stage that contains at least part of the predecoding circuit and a second stage, which comprises at least part of the sub-decoding circuits, the pipeline register between the first and second stage comprising respective sub-registers coupled to respective ones of the sub-decoding circuits, each sub-register having an update enable input to selectively enable update at the end of an instruction cycle, the predecoding circuit being coupled to the update enable inputs to control freezing and passing.

4. An instruction processing circuit according to claim 1, wherein the control inputs of the execution circuit include a control input that is driven alternatively by respective ones of the sub-decoding circuits depending on the detected type of instruction.

5. An instruction processing circuit according to claim 4, wherein a first type of instruction, subdecoded by a first one of the sub-decoding circuits, includes memory access instructions with absolute addresses and a second type of instruction, subdecoded by a second one of the sub-decoding circuits, includes memory access instructions with indexed addresses, the control inputs of the execution circuit including an address input coupled to both the first and second one of the sub-decoding circuits.

6. An instruction processing circuit according to claim 1 further comprising:

an operand source coupled to the execution circuit wherein the execution circuit comprises an ALU circuit, the ALU circuit comprising:

an arithmetic part and a logic part arranged to execute multi-bit arithmetic and logic operations respectively, selected dependent on the instructions; and a first operand freezing circuit coupled between the operand source and the arithmetic part, a second operand freezing circuit coupled between the operand source and the logic part, wherein the first and second operand freezing circuits are operable to selectively freeze or pass an operand depending on whether an arithmetic instruction or a logic instruction is executed.

7. A method of processing a program of instructions, the method comprising:

fetching a series of instructions;

decoding the series of instructions, a first part of the decoding being performed by a common predecoder for all instructions of the series of instructions, a second part of the decoding being performed by a selected one of a plurality of parallel further decoders selected by the predecoder depending on a type of each instruction of the series of instructions;

freezing previous instruction information supplied to at least one unused one of the further decoders while instruction information is passed for decoding by another one of the further decoders; and supplying decoded instruction information from the further decoders to an execution unit for execution of the series of instructions;

wherein the freezing is implemented by a freezing circuit, wherein the freezing circuit comprises a freezing register with an input and an output, and a multiplexer with a first input coupled to an instruction source, a second input coupled to the output of the freezing register, an output coupled to the input of the freezing register and to the further decoder that is coupled to the freezing circuit, and a control input coupled to the predecoder.

8. A method of processing a program of instructions according to claim 7, wherein the series of instructions are processed in pipelined fashion in successive instruction cycles, said passing being initiated within an instruction cycle after predecoding of the instruction in that instruction cycle.

9. A method of processing a program of instructions according to claim 7, wherein results of further decoding by different ones of the further decoders are used by a same instruction execution circuit.

* * * * *